(12) United States Patent
Odate et al.

(10) Patent No.: US 10,547,244 B2
(45) Date of Patent: Jan. 28, 2020

(54) POWER SUPPLY APPARATUS AND IMAGE FORMING APPARATUS

(71) Applicant: CANON KABUSHIKI KAISHA, Tokyo (JP)

(72) Inventors: Takashi Odate, Mishima (JP); Keizo Kojima, Yokohama (JP); Atsushi Ohno, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/443,063

(22) Filed: Jun. 17, 2019

(65) Prior Publication Data

US 2019/0393795 A1 Dec. 26, 2019

(30) Foreign Application Priority Data

Jun. 22, 2018 (JP) ................................ 2018-118584

(51) Int. Cl.
| | | |
|---|---|---|
| H02M 3/335 | (2006.01) | |
| G03G 15/01 | (2006.01) | |
| G03G 15/06 | (2006.01) | |
| H02M 3/337 | (2006.01) | |

(52) U.S. Cl.
CPC .... H02M 3/33592 (2013.01); G03G 15/0121 (2013.01); G03G 15/0189 (2013.01); G03G 15/06 (2013.01); H02M 3/3376 (2013.01); H02M 3/33523 (2013.01)

(58) Field of Classification Search
CPC ........................ H02M 3/33523; H02M 3/3376
USPC ..................... 363/21.02, 21.03, 78
See application file for complete search history.

(56) References Cited

U.S. PATENT DOCUMENTS

| | | | |
|---|---|---|---|
| 8,891,997 B2 | 11/2014 | Samejima | |
| 9,274,490 B2 | 3/2016 | Kojima | |
| 9,665,060 B2 | 5/2017 | Odate | |
| 2010/0172157 A1* | 7/2010 | Chen ................. | H02M 3/33592 363/21.02 |
| 2011/0261592 A1* | 10/2011 | Samejima ............... | H02M 1/32 363/21.02 |
| 2013/0064566 A1 | 3/2013 | Kojima | |
| 2015/0016152 A1* | 1/2015 | Kojima .................. | G03G 15/80 363/21.02 |
| 2015/0194896 A1* | 7/2015 | Stuler ............... | H02M 3/33523 363/21.02 |
| 2016/0036335 A1 | 2/2016 | Kojima | |

FOREIGN PATENT DOCUMENTS

JP        H11-225474        8/1999

* cited by examiner

*Primary Examiner* — Gary A Nash
(74) *Attorney, Agent, or Firm* — Venable LLP

(57) ABSTRACT

The power supply apparatus having two switching elements connected to a primary winding of a transformer includes an adjustment unit for adjusting a voltage and supplying the voltage to a control unit. This voltage results from application of a voltage induced in an auxiliary winding while current is flowing in a predetermined direction with respect to the auxiliary winding as a result of the first switching element turned on and the second switching element turned off, and a voltage induced in the auxiliary winding while current is flowing in the direction opposite to the predetermined direction with respect to the auxiliary winding as a result of the first switching element turned off and the second switching element turned on.

16 Claims, 9 Drawing Sheets

FIG. 2G (ii)

POWER SUPPLY APPARATUS AND IMAGE FORMING APPARATUS

BACKGROUND OF THE INVENTION

Field of the Invention

The present invention relates to a power supply apparatus and an image forming apparatus, and in particular relates to a power supply apparatus in which an output voltage from an auxiliary winding of a transformer in a current-resonant converter is supplied to a power supply control IC.

Description of the Related Art

A power supply apparatus based on current resonance (hereinafter referred to as a current-resonant converter) is a type of power supply apparatus in which a voltage input from a commercial AC power supply via a diode bridge is switched with switching elements to output a stable DC voltage via an insulating transformer. A Vcc terminal, which is an input terminal, of a power supply control IC typically receives supply of a voltage resulting from rectifying and smoothing an output voltage from an auxiliary winding wound around the transformer of the current-resonant converter. The number of turns of the auxiliary winding needs to be set to prevent the voltage at the Vcc terminal from falling below the operation-enable voltage of the power supply control IC under the operation conditions of the power supply apparatus.

In a current-resonant converter 600 shown in FIG. 9, FETs 106 and 107 are alternately turned on and off to apply a voltage to a primary winding 109 of a transformer 108. This causes a voltage to be induced in secondary windings 201 and 202 of the transformer 108. The induced voltage is rectified and smoothed by a rectifying and smoothing circuit 203 into a DC voltage Vo, which is supplied to a load 204. Further, a voltage generated in an auxiliary winding 301 of the transformer 108 is rectified and smoothed by a rectifier diode 303 and a smoothing capacitor 307 and supplied to a Vcc terminal of a power supply control IC 110. The current-resonant converter 600 shown in FIG. 9 is configured such that the voltage induced in the auxiliary winding 301 while current is flowing in the positive direction is supplied to the power supply control IC 110; the positive direction is the direction from the start-of-winding to the end-of-winding of the primary winding 109. The driving frequency for the FETs 106 and 107 in the current-resonant converter 600 is adjusted by a PWM controller of the power supply control IC 110 according to the load 204. Specifically, the driving frequency is reduced as the current flowing to the load 204 increases, so that the DC voltage Vo supplied to the load 204 is kept constant by increasing the voltage applied to the primary winding 109 of the transformer 108. Because the voltage applied to the primary winding 109 of the transformer 108 changes with the load 204 in this manner, the voltage generated in the auxiliary winding 301 also changes with the load 204. The change in voltage is affected by the load proportionately with the turns ratio of the auxiliary winding 301 to the primary winding 109.

In recent years, for improved power supply efficiency under light load, power supply control ICs having burst mode have been used for current-resonant converters. Burst mode includes periods in which the ON/OFF control for the FETs 106 and 107 is not performed (hereinafter referred to as switching halt periods). During the switching halt periods, the voltage at the Vcc terminal decreases because the voltage from the auxiliary winding 301 is not supplied. Accordingly, it has become necessary to adjust the number of turns of the auxiliary winding 301 so that the voltage at the Vcc terminal does not fall below the operation-enable voltage of the power supply control IC 110 in the switching halt periods in burst mode.

A method for addressing the above problem of the decrease of the voltage at the Vcc terminal has been proposed. According to this method, two auxiliary windings with different numbers of turns are provided. Normally, voltage is supplied to the Vcc terminal from the auxiliary winding with the smaller number of turns. If the voltage at the Vcc terminal decreases, voltage is also supplied to the Vcc terminal from the auxiliary winding with the larger number of turns (see Japanese Patent Application Laid-Open No. H11-225474).

However, in the current-resonant converter 600 in FIG. 9, the voltage induced in the auxiliary winding 301 can be supplied to the power supply control IC 110 only while the current is flowing through the primary winding 109 in the particular direction. Therefore, to prevent the voltage from falling below the operation-enable voltage of the power supply control IC 110 during burst-mode operation, the number of turns of the auxiliary winding 301 needs to be sufficiently large. As mentioned above, the change in voltage is affected by the load 204 proportionately with the turns ratio of the auxiliary winding 301 to the primary winding 109. Increasing the number of turns of the auxiliary winding 301 causes the voltage in the auxiliary winding 301 to be significantly affected by the variation in the load 204.

For example, if different auxiliary windings 301 are used respectively in burst mode and continuous mode, the voltage at the Vcc terminal significantly varies with the load variation in burst mode. If different auxiliary windings 301 are used in burst mode, the influence of the load 204 on the voltage variation at the Vcc terminal cannot be reduced because the two auxiliary windings are not allowed to have a large difference in the number of turns. In this case, the increase rate of the voltage at the Vcc terminal under heavy load also increases, leading to insufficient withstanding voltages of peripheral components.

SUMMARY OF THE INVENTION

An aspect of the present invention is a power supply apparatus that can reduce the degree of change of output voltage from an auxiliary winding due to a load.

Another aspect of the present invention is a power supply apparatus including: a transformer having a primary winding, a secondary winding and an auxiliary winding; a first switching element connected in series to the primary winding; a capacitor connected in series to the primary winding; a second switching element connected in parallel to the primary winding and the capacitor serially connected to each other; a control unit configured to operate by receiving, as an operation-enable voltage, supply of a voltage induced in the auxiliary winding and to control switching operation of the first switching element and the second switching element; and an adjustment unit configured to adjust a voltage and supply the voltage to the control unit, the voltage resulting from application of a voltage induced in the auxiliary winding while current is flowing in a predetermined direction with respect to the auxiliary winding as a result of the first switching element turned on and the second switching element turned off, and a voltage induced in the auxiliary winding while current is flowing in a direction opposite to the predetermined direction with respect to the auxiliary winding as a result of the first switching element turned off and the second switching element turned on.

A further aspect of the present invention is an image forming apparatus including an image forming unit for forming an image, and a power supply apparatus for supplying power to the image forming apparatus, wherein a transformer having a primary winding, a secondary winding and an auxiliary winding, a first switching element connected in series to the primary winding, a capacitor connected in series to the primary winding, a second switching element connected in parallel to the primary winding and the capacitor connected in series to the primary winding, a control unit configured to operate with an operation-enable voltage which is a voltage induced in the auxiliary winding to control switching operation of the first switching element and the second switching element, and an adjustment unit configured to adjust a resultant voltage in which a voltage induced in the auxiliary winding while current is flowing in a predetermined direction with respect to the auxiliary winding in a case where the first switching element turned on and the second switching element turned off is applied into a voltage induced in the auxiliary winding while current is flowing in an opposite direction opposite to the predetermined direction with respect to the auxiliary winding in a case where the first switching element turned off and the second switching element turned on, and supply the resultant voltage to the control unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Specific configurations of the present invention for solving the above problem will be described based on embodiments. The embodiments set forth below are merely exemplary and not intended to limit the technical scope of the present invention to these embodiments.

[Description of Configuration of Power Supply Apparatus]

Figure 1:
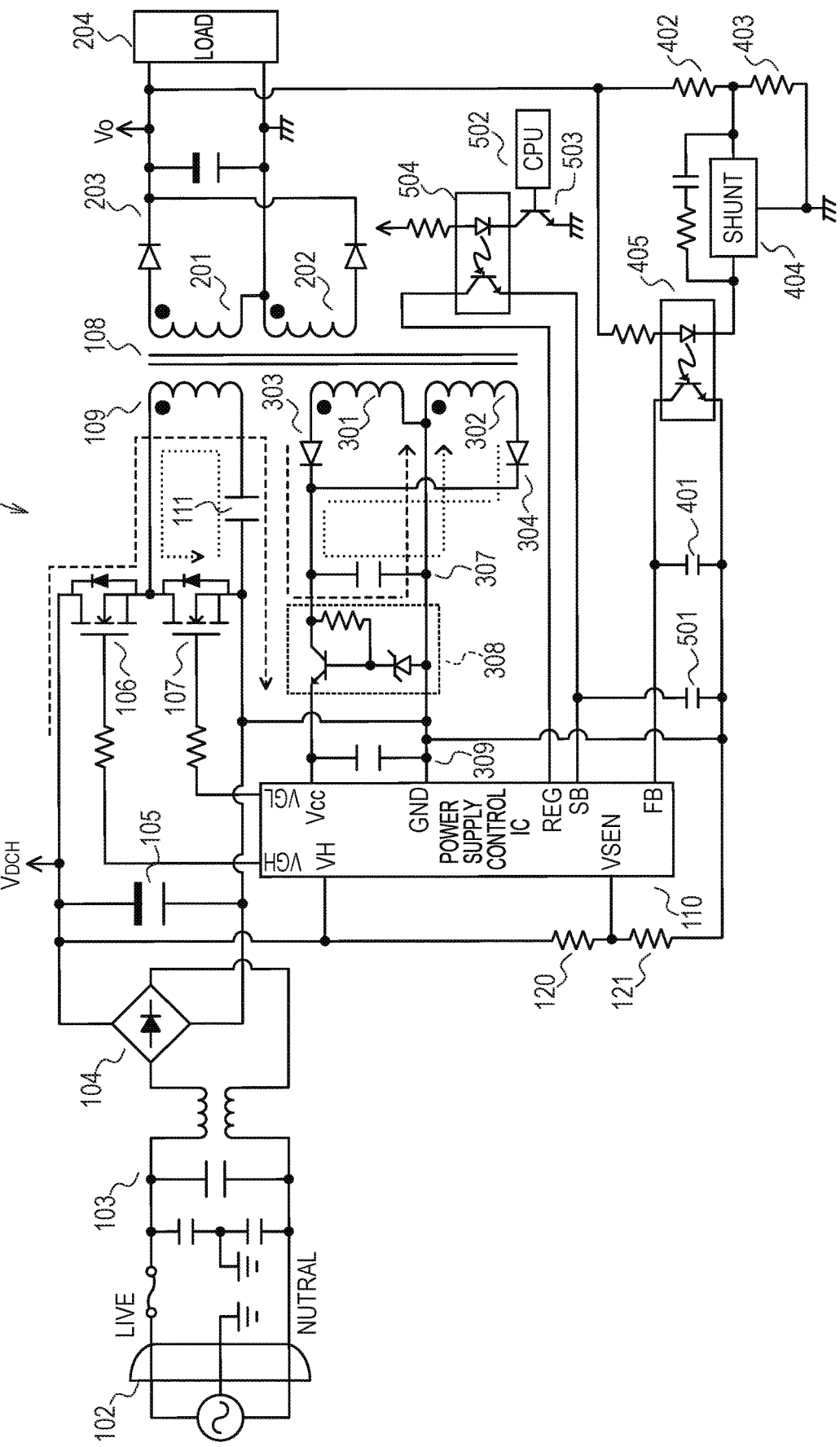
FIG. 1 is a circuit diagram of a power supply apparatus in a first embodiment.

FIG. 1 illustrates a main circuit diagram of a current-resonant converter 100, which is a power supply apparatus in a first embodiment. The current-resonant converter 100 is a power supply apparatus having a current-resonant power supply unit based on current resonance. In FIG. 1, flows of current are indicated by dashed-line arrows and dotted-line arrows. The current-resonant converter 100 in FIG. 1 includes an inlet 102, an input filter circuit 103, a rectifier diode bridge 104 and a primary smoothing capacitor 105. The current-resonant converter 100 includes field-effect transistors (hereinafter referred to as FETs) 106 and 107, a current-resonant capacitor 111, a power supply control IC 110 and a transformer 108. The input filter circuit 103 includes components such as a common-mode coil and an across-the-line capacitor. The transformer 108 is designed to have a controlled leakage inductance. The transformer 108 has a primary winding 109, secondary windings 201 and 202, and auxiliary windings 301 and 302. The auxiliary winding 301 (a first auxiliary winding) and the auxiliary winding 302 (a second auxiliary winding) are wound on the primary side of the transformer 108 and supply power to the power supply control IC 110. Specifically, the anode terminal of a rectifier diode 303 is connected to the start-of-winding of the auxiliary winding 301, and the start-of-winding of the auxiliary winding 302 is connected to the end-of-winding of the auxiliary winding 301. Here, black circles beside the windings of the transformer 108 each indicate the start-of-winding. The end-of-winding of the auxiliary winding 301 and the start-of-winding of the auxiliary winding 302 are connected to a GND terminal of the power supply control IC 110. The end-of-winding of the auxiliary winding 302 is connected to the anode terminal of a rectifier diode 304. The cathode terminal of the rectifier diode 303 is connected to the cathode terminal of the rectifier diode 304. The FET 106, which is a first switching element, is connected in series to the primary winding 109 of the transformer 108. The current-resonant capacitor 111 is connected in series to the primary winding 109 of the transformer 108. The FET 107, which is a second switching element, is connected in parallel to the serially connected primary winding 109 and current-resonant capacitor 111.

The power supply control IC 110, which is a control unit, includes a VH terminal, a VSEN terminal, a VGH terminal, a VGL terminal, a Vcc terminal, an REG terminal, an FB terminal, an SB terminal and a GND terminal. The VH terminal is an activation terminal to which a voltage is supplied at the time of activation. The VSEN terminal is a terminal for detecting an input voltage from a power supply. The VGH terminal is a terminal for controlling output to the gate terminal of the FET 106. The VGL terminal is a terminal for controlling output to the gate terminal of the FET 107. The Vcc terminal is a terminal for receiving power supply. The REG terminal is a terminal that outputs a constant voltage. The FB terminal is a terminal for monitoring a DC voltage Vo, which is an output voltage. The SB terminal will be described below. The GND terminal is a terminal connected to ground.

In the power supply control IC 110, a voltage (VDCH) smoothed by the primary smoothing capacitor 105 is input to the VH terminal and supplied to the Vcc terminal through the inside of the power supply control IC 110. The voltage at the Vcc terminal is increased to the voltage at which the activation of the power supply control IC 110 is started (hereinafter referred to as an activation-start voltage). Further, the voltage (VDCH) smoothed by the primary smoothing capacitor 105 is divided by resistors 120 and 121, and the resulting voltage is input to the VSEN terminal. When the voltage input to the VSEN terminal increases to an operation-start threshold, the power supply control IC 110 is ready to perform switching operation. Once the power supply control IC 110 starts the switching operation, power supply from an auxiliary-winding power supply circuit (to be described below) to the Vcc terminal is started. Upon start of the power supply from the auxiliary-winding power supply circuit to the Vcc terminal, the power supply control IC 110 cuts off the power supply from the VH terminal to the Vcc terminal. If the voltage at the Vcc terminal decreases below an operation-stop voltage, the power supply control IC 110 tries to be reactivated by supplying power from the VH terminal to the Vcc terminal. Supplying power from the VH terminal to the Vcc terminal consumes much power. Therefore, a sufficient output voltage needs to be ensured in the auxiliary-winding power supply circuit so that this reactivation does not occur at the time under light load, which is when highly efficient power supply is required.

The power supply control IC 110 has the function of switching between two modes. A first mode of the two modes will be hereinafter referred to as the continuous mode, which involves continuously performing the switching operation of the FETs 106 and 107. A second mode of the two modes will be hereinafter referred to as the intermittent mode. The intermittent mode involves alternately repeating the period in which the switching operation of the FETs 106 and 107 is performed (hereinafter referred to as a switching period) and the period in which the switching operation is halted (hereinafter referred to as a switching halt period). Having the function of switching between the continuous mode and the intermittent mode, the power supply control IC 110 switches between the modes and further controls the switching operation in the intermittent mode, according to the voltage at the above-mentioned SB terminal. The power supply control IC 110 operates in the continuous mode if the voltage at the SB terminal exceeds a mode-switching threshold, and operates in the intermittent mode if the voltage at the SB terminal falls to or below the mode-switching threshold.

The current-resonant converter 100 includes a capacitor 401, a rectifying and smoothing circuit 203, resistors 402 and 403, a shunt regulator 404 and a photocoupler 405. The capacitor 401 accumulates electric charge supplied from the FB terminal. The FB terminal of the power supply control IC 110 includes a constant-current circuit inside the IC. The SB terminal of the power supply control IC 110 includes constant-current charge and discharge circuits inside the IC. In the power supply control IC 110 used in the first embodiment, the frequency of the switching operation (hereinafter referred to as the switching frequency) in the intermittent mode is controlled according to the voltage at the SB terminal. The rectifying and smoothing circuit 203 includes a rectifier diode and a smoothing capacitor. The DC voltage Vo, which is a DC voltage rectified and smoothed by the rectifying and smoothing circuit 203, is supplied to a load 204. The shunt regulator 404 includes an REF terminal for receiving input of a reference voltage, and a cathode K terminal and an anode A terminal as outputs. The shunt regulator 404 operates according to the DC voltage Vo to change the voltage at the FB terminal. Based on this change, the power supply control IC 110 performs the switching control for the FETs 106 and 107, thereby controlling the DC voltage Vo to be constant (to be a predetermined voltage). That is, the power supply control IC 110 performs feedback control for the DC voltage Vo based on the voltage at the FB terminal. Hereinafter, the voltage at each terminal will be referred to as the terminal voltage (for example, the voltage at the FB terminal will be referred to as the FB terminal voltage).

The current-resonant converter 100 includes a CPU 502, a transistor 503 and a photocoupler 504. The CPU 502 may be a CPU provided in the apparatus that includes the current-resonant converter 100 (for example, an image forming apparatus that includes the current-resonant converter 100). When the power supply control IC 110 is to be operated in the continuous mode, the CPU 502 outputs a high-level signal to the base terminal of the transistor 503 to turn on the transistor 503. Turning on the transistor 503 causes the photocoupler 504 to be turned on, so that the REG terminal voltage in the power supply control IC 110 is input to the SB terminal. The SB terminal voltage then exceeds the mode-switching threshold. Consequently, the power supply control IC 110 operates in the continuous mode. When the power supply control IC 110 is to be operated in the intermittent mode, the CPU 502 outputs a low-level signal to the base terminal of the transistor 503 to turn off the transistor 503. Turning off the transistor 503 causes the photocoupler 504 to be turned off, so that the SB terminal voltage in the power supply control IC 110 falls to or below the mode-switching threshold. Consequently, the power supply control IC 110 operates in the intermittent mode.

The current-resonant converter 100 includes a capacitor 501. The capacitor 501 is connected to the SB terminal of the power supply control IC 110 and charged and discharged by the constant-current charge and discharge circuits for the SB terminal voltage. The switching control in the intermittent mode is performed according to the FB terminal voltage and the SB terminal voltage in the power supply control IC 110. Once the mode is switched to the intermittent mode, the DC voltage Vo gradually decreases during the switching halt period and therefore the FB terminal voltage increases. If the FB terminal voltage exceeds a threshold voltage, current is supplied from the constant-current charge circuit at the SB terminal of the power supply control IC 110 to charge the capacitor 501, so that the SB terminal voltage increases. If the SB terminal voltage exceeds a threshold voltage, the halted switching operation is resumed. In the intermittent mode, the switching frequency decreases as the SB terminal voltage increases. As the DC voltage Vo increases, the FB terminal voltage decreases. If the FB terminal voltage falls to or below the threshold voltage, the SB terminal switches to the constant-current discharge circuit to discharge the capacitor 501, so that the SB terminal voltage decreases. If the SB terminal voltage falls to or below the threshold voltage, the switching operation is halted to enter the switching halt period. In the switching halt period, no power is supplied to the secondary windings 201 and 202 of the transformer 108. Therefore, if current is continuously supplied to the load 204, the electric charge gradually decreases and the DC voltage Vo gradually decreases, so that the above-described switching operation is resumed. In this manner, the switching period and the switching halt period are alternately repeated in the intermittent mode.

[Operations of Current-Resonant Power Supply Unit]

Operations in the current-resonant converter 100 will now be described below. In the above-described configuration, once power is supplied to the power supply control IC 110, control signals are output from the VGH terminal and the VGL terminal of the power supply control IC 110 to the gate terminals of the FET 106 and the FET 107, respectively. This brings alternate ON/OFF operation of the FET 106 and the FET 107. The voltage in the primary smoothing capacitor 105 is applied to the primary winding 109 of the transformer 108, so that alternating current flows through the primary winding 109. Referring to FIGS. 2A to 2G(ii), the flow of the alternating current through the primary winding 109 of the transformer 108 will be described step by step in connection with the ON/OFF states of the FETs 106 and 107. FIG. 2G(i) illustrates the waveform of the drain current in the FET 106, and FIG. 2G(ii) illustrates the waveform of the drain current in the FET 107. The drain current is shown positive when flowing from the start-of-winding (the black circle) to the end-of-winding of the primary winding 109 of the transformer 108, and shown negative when flowing in the opposite direction. The sequential numbers such as "phase 1" in FIGS. 2G(i) and 2G(ii) correspond to FIGS. 2A to 2F, respectively. FIGS. 2A to 2F show only some main components of the current-resonant converter 100.

Figure 2A:
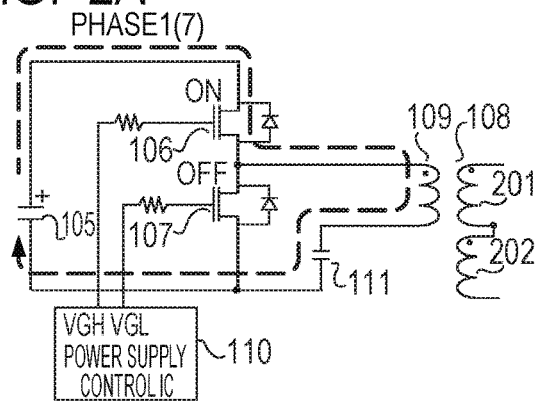
FIGS. 2A, 2B, 2C, 2D, 2E and 2F are diagrams for describing operations in the power supply apparatus in the first embodiment.

Phase 1 (the state shown in FIG. 2A)

When the FET 106 is on (shown as ON) and the FET 107 is off (shown as OFF), the current flows through the following path: the primary smoothing capacitor 105→ the FET 106→ the primary winding 109 of the transformer 108→ the current-resonant capacitor 111→ the primary smoothing capacitor 105.

Figure 2B:
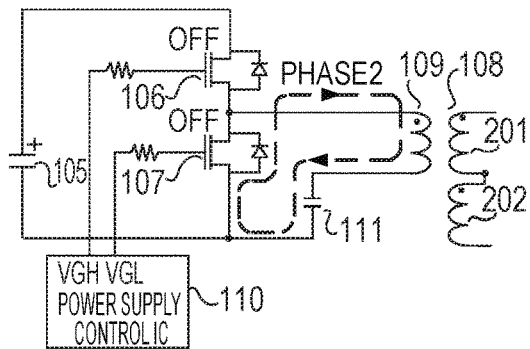

Phase 2 (the state shown in FIG. 2B)

From the state of phase 1, the FET 106 is turned off (the FET 107 remains off). Even though the FET 106 is turned off, the current flowing through the primary winding 109 of the transformer 108 tries to maintain the flow. Therefore, the current flows through the following path: the primary winding 109 of the transformer 108→ the current-resonant capacitor 111→ a parasitic diode in the FET 107.

Figure 2C:
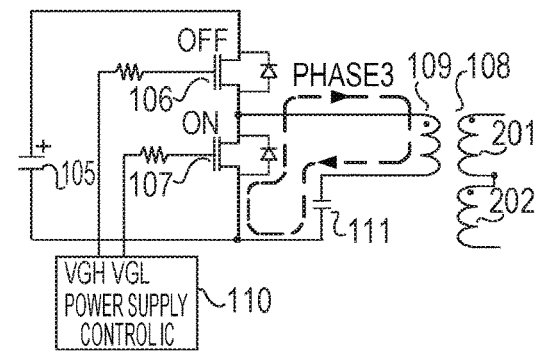

Phase 3 (the state shown in FIG. 2C)

From the state of phase 2, the FET 107 is turned on (FET 106 remains off). Immediately after the FET 107 is turned on, the current still flows through the following path: the primary winding 109 of the transformer 108→ the current-resonant capacitor 111→ the parasitic diode in the FET 107.

Figure 2D:
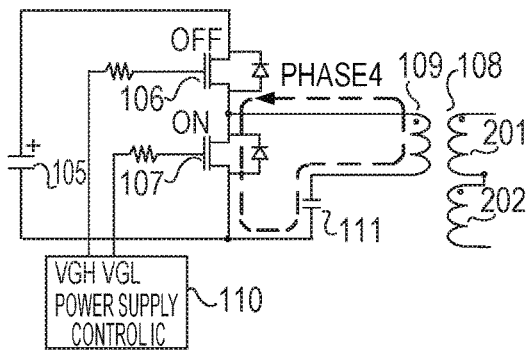

Phase 4 (the state shown in FIG. 2D)

After a certain period in the state of phase 3 (the FET 106 is off, and the FET 107 is on), a resonance effect occurs between the leakage inductance of the transformer 108 and the current-resonant capacitor 111. Therefore, the path of the current flow gradually changes into the path: the current-resonant capacitor 111→ the primary winding 109 of the transformer 108→ the FET 107.

Figure 2E:
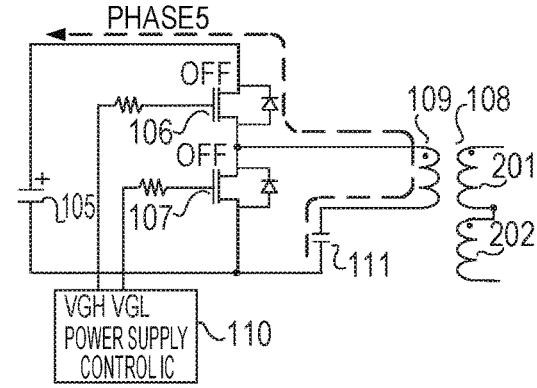

Phase 5 (the state shown in FIG. 2E)

From the state of phase 4, the FET 107 is turned off (the FET 106 remains off). Even though the FET 107 is turned off, the current flowing through the primary winding 109 of the transformer 108 tries to maintain the flow. Therefore, the current flows through the following path: the primary winding 109 of the transformer 108→ a parasitic diode in the FET 106→ the primary smoothing capacitor 105.

Figure 2F:
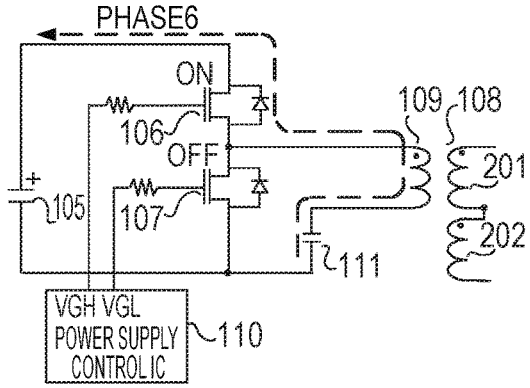
Figure 2G:
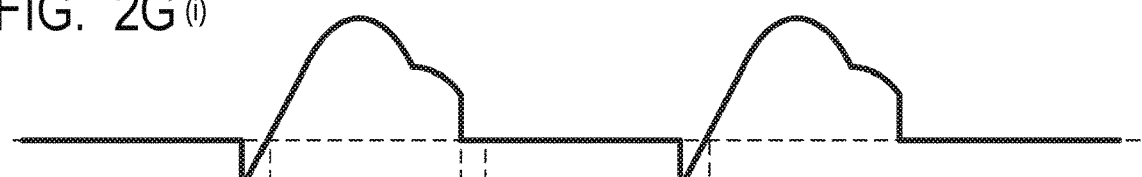
FIGS. 2G(i) and 2G(ii) are graphs illustrating the waveforms of drain currents of FETs.
Figure 2G:
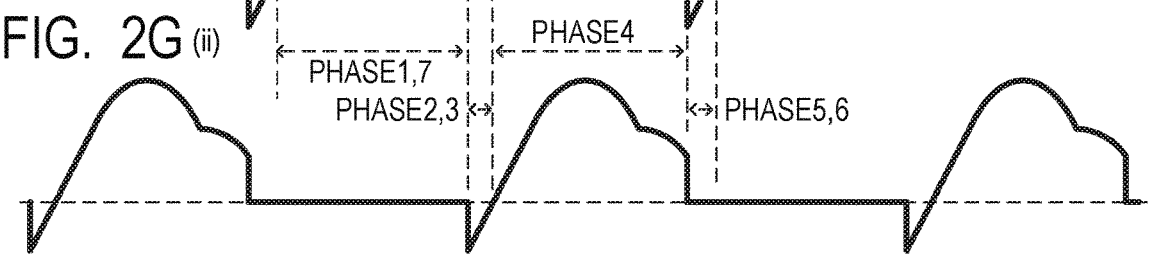

Phase 6 (the state shown in FIG. 2F)

From the state of phase 5, the FET 106 is turned on (the FET 107 remains off). Even though the FET 106 is turned on, the current still flows through the following path: the primary winding 109 of the transformer 108→ the parasitic diode in the FET 106→ the primary smoothing capacitor 105.

Phase 7 (the state shown in FIG. 2A)

After a certain period in the state of phase 6 (the FET 106 is on, and the FET 107 is off), a resonance effect occurs between the leakage inductance of the transformer 108 and the current-resonant capacitor 111. Therefore, the path of the current flow gradually changes into the path: the primary smoothing capacitor 105→ the FET 106→ the primary winding 109 of the transformer 108→ the current-resonant capacitor 111→ the primary smoothing capacitor 105.

In this manner, the alternating current flows through the primary winding 109 of the transformer 108 in the positive direction and the opposite direction (negative direction). This induces an AC voltage in the secondary windings 201 and 202 of the transformer 108, and the induced voltage is rectified and smoothed by the rectifying and smoothing circuit 203 into the DC voltage Vo. Similarly, an AC voltage is induced in the auxiliary windings 301 and 302 of the transformer 108 and rectified and smoothed by the rectifier diodes 303 and 304 and the smoothing capacitor 307. The rectified and smoothed voltage is passed through a regulation circuit 308 and smoothed by a smoothing capacitor 309, and input to the Vcc terminal of the power supply control IC 110.

[Description of Auxiliary-Winding Power Supply Circuit]

The auxiliary-winding power supply circuit will now be described. The auxiliary-winding power supply circuit includes the auxiliary windings 301 and 302, the rectifier diodes 303 and 304, the smoothing capacitors 307 and 309, and the regulation circuit 308. FIG. 1 shows the directions of current as dashed-line arrows and dotted-line arrows. Here, the dashed-line arrows indicate the positive direction; the positive direction is the direction from the start-of-winding to the end-of-winding of the primary winding 109 of the transformer 108 (a predetermined direction). In FIGS. 2A to 2C, the current is flowing in the positive direction in phase 1 (phase 7) (FIG. 2A), phase 2 (FIG. 2B) and phase 3 (FIG. 2C). The dotted-line arrows indicate the direction (negative direction) opposite to the positive direction. In FIGS. 2D to 2F, the current is flowing in the opposite direction in phase 4 (FIG. 2D), phase 5 (FIG. 2E) and phase 6 (FIG. 2F).

As described above, the power supply control IC 110 switches the FETs 106 and 107 to cause alternating current to flow through the primary winding 109 of the transformer 108. This induces an AC voltage in the auxiliary windings 301 and 302 of the transformer 108. In the auxiliary-winding power supply circuit, the voltage induced in the auxiliary windings 301 and 302 is rectified and smoothed by the rectifier diodes 303 and 304 and the smoothing capacitor 307. The voltage is then passed through the regulation circuit 308 and smoothed by the smoothing capacitor 309. The voltage generated by the auxiliary-winding power supply circuit is input to the Vcc terminal of the power supply control IC 110.

Here, if the load 204 that receives supply of the secondary-side output increases, the voltage induced in the auxiliary windings 301 and 302 increases. Therefore, the regulation circuit 308 is provided so that the voltage input to the Vcc terminal of the power supply control IC 110 does not exceed the rating of the Vcc terminal, i.e., so that the voltage input to the Vcc terminal does not reach or exceed a predetermined voltage. As will be described below with respect to FIG. 3C, the regulation circuit 308 outputs a predetermined voltage to the Vcc terminal if the voltage smoothed by the smoothing capacitor 307 is not lower than the predetermined voltage. If the voltage smoothed by the smoothing capacitor 307 is lower than the predetermined voltage, the regulation circuit 308 outputs, to the Vcc terminal, a voltage induced in the auxiliary windings 301 and 302 and smoothed by the smoothing capacitor 307. The predetermined voltage is determined by a Zener voltage of a Zener diode in the regulation circuit 308. Thus, the regulation circuit 308 supplies the voltage smoothed by the smoothing capacitor 307 to the Vcc terminal under light load, and supplies the predetermined voltage to the Vcc terminal under heavy load. Hereinafter, the phrase "the regulation circuit 308 operates" refers to the state in which the regulation circuit 308 supplies the predetermined voltage to the Vcc terminal due to the increased load 204. Also, an operation voltage of the regulation circuit 308 refers to the voltage at which the regulation circuit 308 starts operating (the predetermined voltage).

When current flows in the direction of the dashed-line arrow (the positive direction with respect to the primary winding 109 of the transformer 108), a voltage is induced in the auxiliary winding 301 and supplied to the Vcc terminal. When current flows in the direction of the dotted-line arrow (the opposite direction with respect to the primary winding 109 of the transformer 108), a voltage is induced in the auxiliary winding 302 and supplied to the Vcc terminal. Thus, the auxiliary-winding power supply circuit supplies, to the power supply control IC 110, the voltage induced alternately according to the bidirectional current flowing through the primary winding 109 of the transformer 108.

As described above, the power supply control IC 110 used in the first embodiment can operate in the intermittent mode. During the switching halt period, no voltage is induced in the auxiliary windings 301 and 302, and the Vcc terminal voltage decreases due to power consumption by the power supply control IC 110. Therefore, the numbers of turns of the auxiliary windings 301 and 302 need to be determined to prevent the Vcc terminal voltage from falling below the operation-enable voltage in the switching halt period. In conventional auxiliary-winding power supply circuits (which do not have the auxiliary winding 302), the Vcc terminal voltage is supplied from the auxiliary winding 301 only when the current flows in the direction of the dashed-line arrow. In this conventional configuration, the number of turns of the auxiliary winding 301 needs to be large to satisfy the operation-enable voltage because the amount of power supplied to the Vcc terminal is small. However, increasing the number of turns of the auxiliary winding 301 as in the conventional configuration increases the variation in the output voltage from the auxiliary winding 301 affected by the variation in the load 204.

Figure 3A:
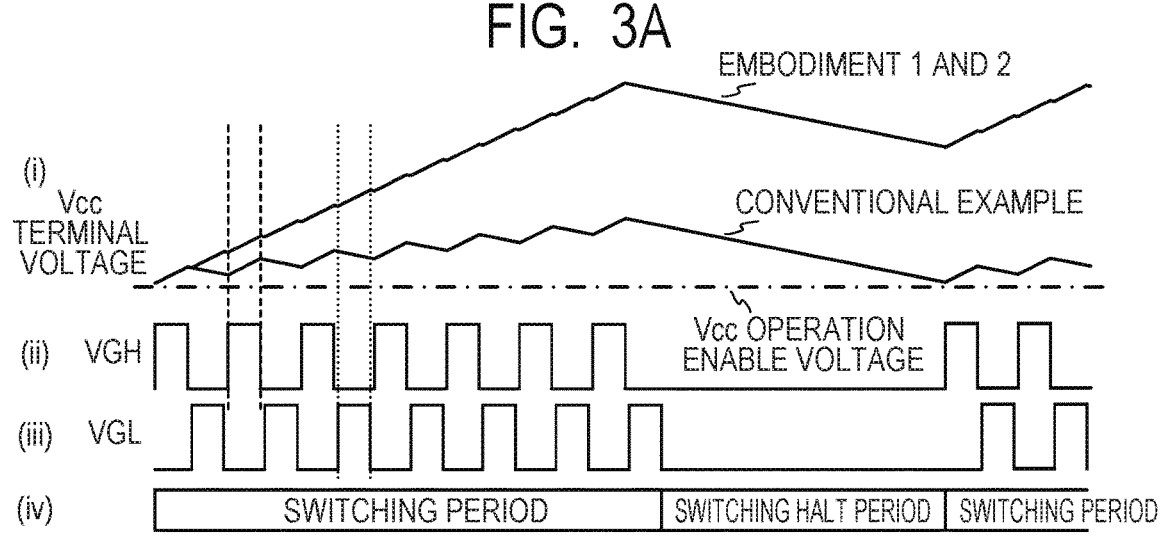
FIGS. 3A, 3B and 3C are graphs illustrating Vcc terminal voltages in the first embodiment and a second embodiment.
Figure 3B:
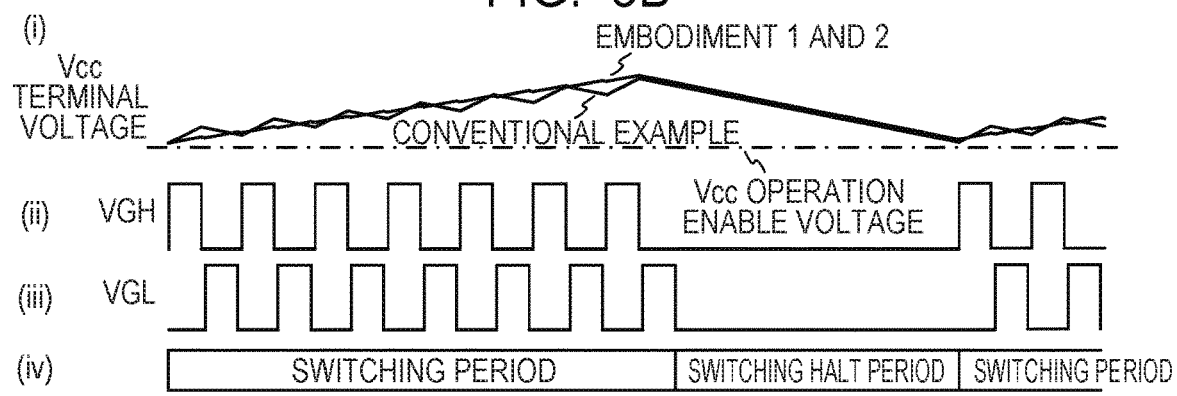
Figure 3C:
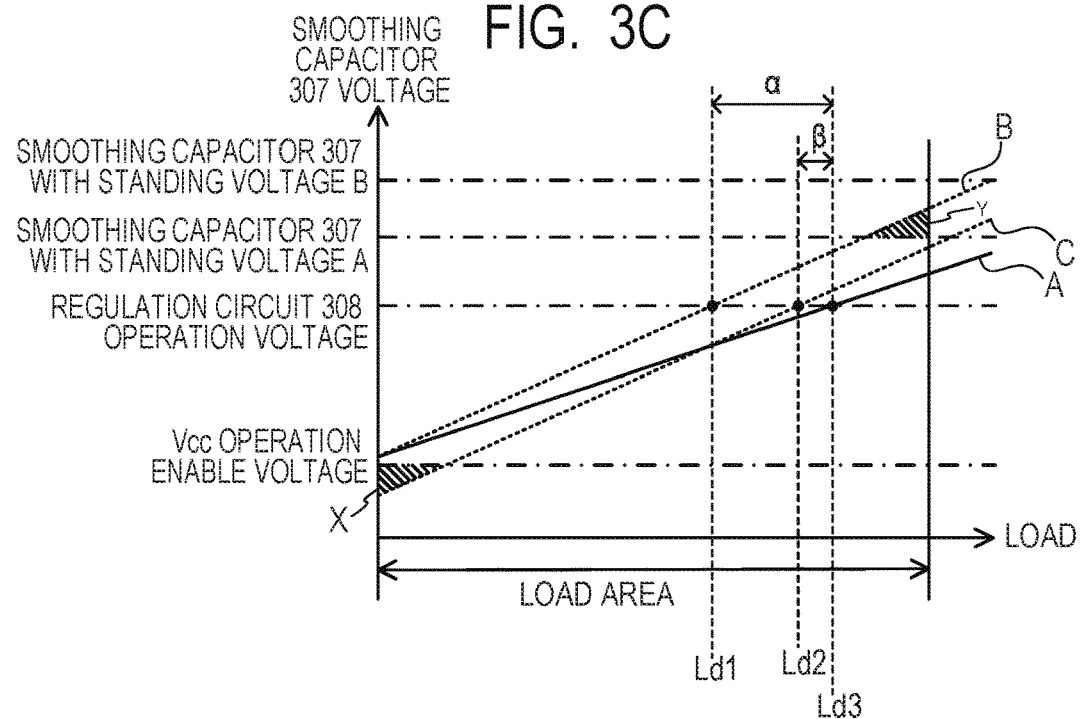

FIG. 3C illustrates the magnitude of the load 204 on the abscissa, and the voltage in the smoothing capacitor 307 on the ordinate. Double-headed arrows on the abscissa indicate the ranges of the load 204 (load ranges). The ordinate also indicates two withstanding voltages selected for the smoothing capacitor 307 (a withstanding voltage A and a withstanding voltage B, B>A). The ordinate further indicates the operation voltage at which the regulation circuit 308 starts operating, and the operation-enable voltage (shown as Vcc operation-enable voltage) of the power supply control IC 110. A solid line A indicates the case in the first embodiment, and dotted lines B and C indicate the case in a conventional example. The dotted line B in the conventional example is a graph in the case where the number of turns of the auxiliary winding 301 is set so that the voltage in the smoothing capacitor 307 under light load does not fall below the operation-enable voltage of the power supply control IC 110. As shown in the hatched area Y in FIG. 3C, for dotted line B in the conventional example, the withstanding voltage A of a peripheral component (the smoothing capacitor 307) is exceeded under heavy load. Therefore, for the dotted line B, it is necessary to use the smoothing capacitor 307 characterized by the withstanding voltage B higher than the withstanding voltage A so that the withstanding voltage is not exceeded even under heavy load. To use the smoothing capacitor 307 with the withstanding voltage A, the dotted line C needs to be adopted so that the withstanding voltage A is not exceeded even under heavy load. This requires reducing the number of turns of the auxiliary winding 301. If the number of turns of the auxiliary winding 301 is reduced, then the voltage in the smoothing capacitor 307 under light load falls below the operation-enable voltage of the power supply control IC 110, as shown in the hatched area X in FIG. 3C.

As above, in the conventional example, if the number of turns of the auxiliary winding 301 is determined to satisfy the condition that the voltage in the smoothing capacitor 307 under light load should not be below the operation-enable voltage, the withstanding voltage of the smoothing capacitor 307 is exceeded under heavy load. This will affect the cost and the substrate size. If the number of turns of the auxiliary winding 301 is determined so that the withstanding voltage A of the smoothing capacitor 307 is not exceeded under heavy load, the voltage in the smoothing capacitor 307 under light load falls below the operation-enable voltage.

FIGS. 3A and 3B illustrate graphs of the Vcc terminal voltage observed when the minimum current flows to the load 204 in the first embodiment. FIGS. 3A and 3B both illustrate the following waveforms: (i) the waveforms of the Vcc terminal voltage (in the first embodiment and the conventional example), (ii) the waveform of signals output from the VGH terminal that drives the FET 106, and (iii) the waveform of signals output from the VGL terminal that drives the FET 107, and also illustrate (iv) the state of the switching operation (the switching period and the switching halt period). The dot-and-dash line in (i) indicates the operation-enable voltage of the power supply control IC 110 (shown as Vcc operation-enable voltage). The VGH terminal and the VGL terminal output a high-level signal to turn on the respective FETs 106 and 107 and output a low-level signal to turn off the respective FETs 106 and 107.

Figure 9:
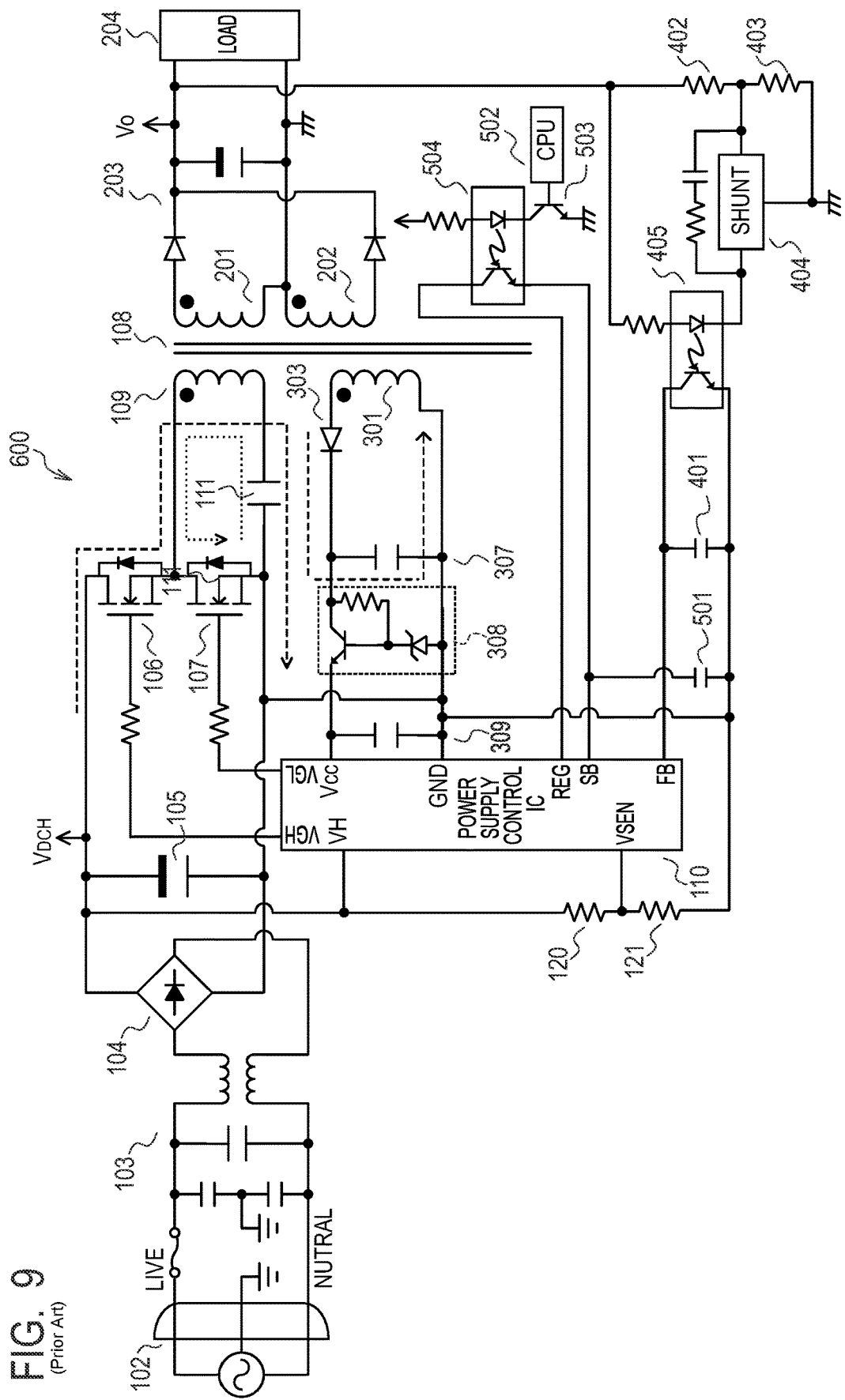
FIG. 9 is a circuit diagram of a power supply apparatus in a conventional example.

FIG. 3A is a graph illustrating the Vcc terminal voltage in the case of employing the auxiliary-winding power supply circuit in the first embodiment, with the number of turns of the auxiliary winding 301 unchanged from the conventional example. The power supply circuit in the conventional example is configured as shown in FIG. 9, in which the same components as in FIG. 1 are labeled with the same reference symbols. As shown in FIG. 9, the Vcc terminal voltage is supplied from the auxiliary winding 301 when current is flowing in the direction of the dashed-line arrow in the conventional example. In addition to this configuration, the first embodiment causes the Vcc terminal voltage to be supplied from the auxiliary winding 302 when current is flowing in the direction of the dotted-line arrow. Therefore, even though the number of turns of the auxiliary winding 301 is the same as in the conventional example, the amount of power supplied by the auxiliary windings 301 and 302 to the Vcc terminal is larger than that in the conventional example, resulting in an increased Vcc terminal voltage.

FIG. 3B is a graph of the Vcc terminal voltage in the case where the number of turns of the auxiliary winding 301 in the first embodiment is reduced so that the Vcc terminal voltage becomes equivalent to the Vcc terminal voltage obtained with the number of turns of the auxiliary winding 301 in the conventional example. Reducing the number of turns of the auxiliary winding 301 causes a reduced amount of power to be supplied from the auxiliary windings 301 and 302 in one switching operation of the FETs 106 and 107. However, in contrast to the conventional example, the Vcc terminal voltage is supplied from the auxiliary winding 302 even when the FET 107 is on (the VGL signal is at the high level) and current is flowing in the direction of the dotted-line arrow. Therefore, the Vcc terminal voltage equivalent to that in the conventional example can be ensured.

Here, the auxiliary winding 301 and the auxiliary winding 302 desirably have the same number of turns. If the auxiliary winding 301 and the auxiliary winding 302 have different numbers of turns, the auxiliary winding with the smaller number of turns may not be able to supply sufficient power. For supplying a further increased amount of power, multiple windings may be provided in parallel to the auxiliary winding 301 and the auxiliary winding 302. If multiple auxiliary windings 301 and auxiliary windings 302 are used, the group of parallel auxiliary windings 301 and the group of parallel auxiliary windings 302 may include the same number of windings to enable power supply from both auxiliary winding groups and increase the amount of supplied power.

By reducing the numbers of turns of the auxiliary windings 301 and 302 as above, the variation in the voltage in the auxiliary windings 301 and 302 (shown as the solid line A in FIG. 3C) with respect to the variation in the load 204 is reduced. This allows using the smoothing capacitor 307 with a low withstanding voltage (for example, the withstanding voltage A). That is, the increase rate of the voltage in the smoothing capacitor 307 with respect to the load 204 is lower than that in the conventional case; in other words, the gradient of the solid line A is smaller than the gradient of the dotted lines B and C. The Vcc terminal voltage in the power supply control IC 110 under light load does not fall below the operation-enable voltage. Thus, in the circuit in the first embodiment, the voltage in the smoothing capacitor 307 (corresponding to the Vcc terminal voltage) shown as the solid line A does not take values in the hatched areas X and Y in the FIG. 3C.

Further, for the regulation circuit 308 configured by taking into account the withstanding voltage of the Vcc terminal, the load that causes the regulation circuit 308 to start operation increases because of the reduced voltage variation in the auxiliary windings 301 and 302 with respect to the load variation. Specifically, in FIG. 3C, for the dotted line B in the conventional case, the voltage in the smoothing capacitor 307 reaches the operation voltage of the regulation circuit 308 at a load Ld1. For the dotted line C in the conventional case, the voltage in the smoothing capacitor 307 reaches the operation voltage of the regulation circuit 308 at a load Ld2. By contrast, for the solid line A in the first embodiment, the voltage in the smoothing capacitor 307 reaches the operation voltage of the regulation circuit 308 at a load Ld3 larger than the loads Ld1 and Ld2 (Ld3>Ld1, and Ld3>Ld2). Thus, compared with the conventional example, the first embodiment can delay the timing of starting the operation of the regulation circuit 308 (hereinafter also referred to as regulation-start timing). Therefore, in the ranges where the regulation circuit 308 does not operate in the first embodiment although operating in the conventional example, the power consumption in the regulation circuit 308 can be reduced. That is, compared with the conventional example, the circuit in the first embodiment can delay the start of the operation of the regulation circuit 308 for the ranges α and β of the load 204 shown in FIG. 3C, so that power consumption in the regulation circuit 308 can be reduced.

Thus, by employing the auxiliary-winding power supply circuit in the first embodiment, an output voltage equivalent to the voltage in the conventional example can be supplied as the Vcc terminal voltage of the power supply control IC 110, using the auxiliary windings 301 and 302 with a reduced number of turns. By reducing the number of turns of the auxiliary windings 301 and 302, the variation in the output voltage from the auxiliary windings 301 and 302 due to the variation in the load 204 can be reduced. This allows reducing the withstanding voltage of peripheral components (for example, the smoothing capacitor 307) under heavy load when the output voltage from the auxiliary windings 301 and 302 increases, leading to a reduced cost and a reduced substrate area. Further, because the regulation-start timing of the regulation circuit 308 can be delayed, power consumption by the regulation circuit 308 can be reduced.

Thus, according to the first embodiment, the degree of change of the output voltage from the auxiliary windings due to the load can be reduced.

[Description of Auxiliary-Winding Power Supply Circuit]

Figure 4:
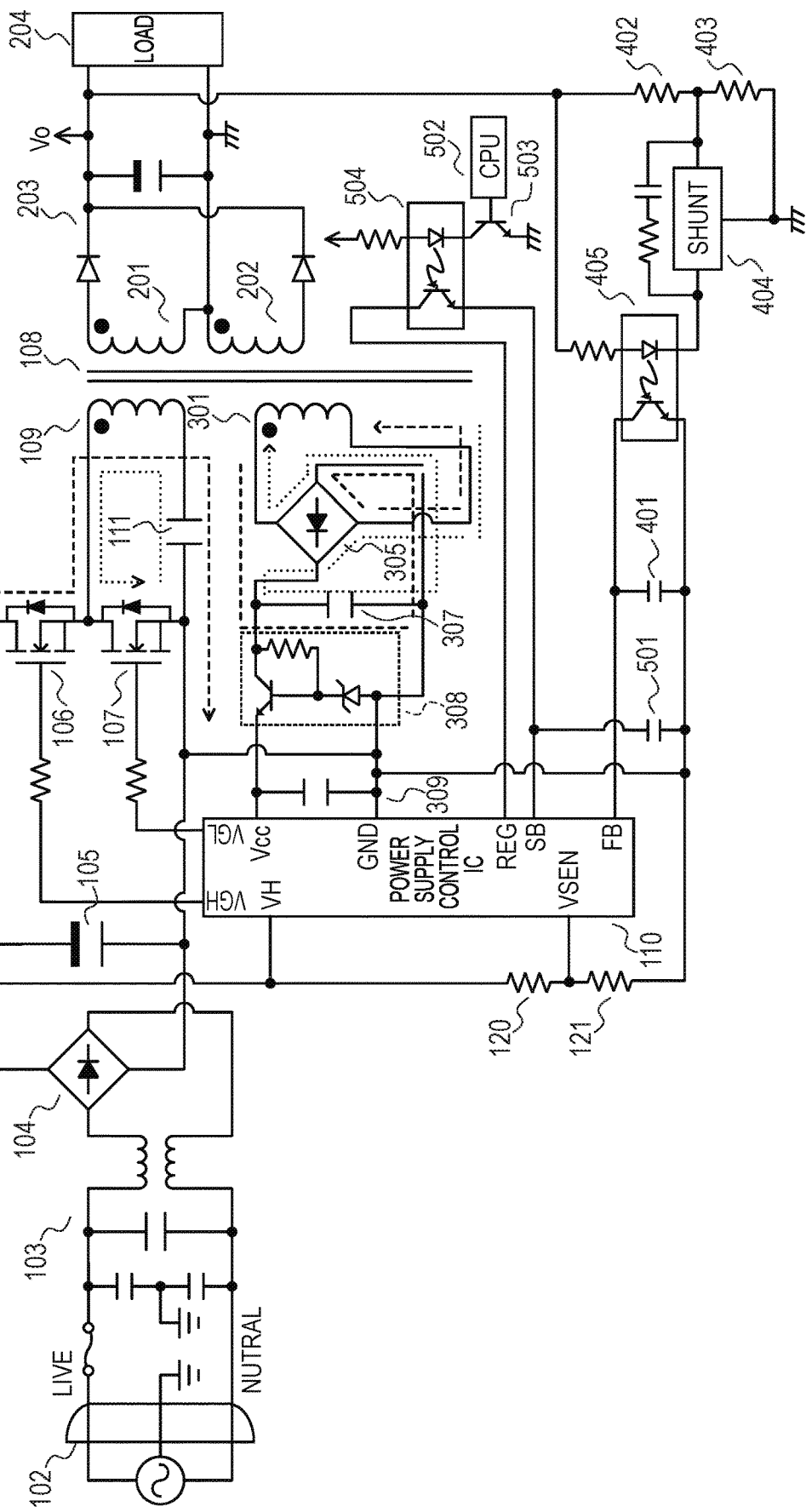
FIG. 4 is a circuit diagram of a power supply apparatus in the second embodiment.

A current-resonant converter 200, which is a power supply apparatus in a second embodiment, will be described with reference to FIG. 4. The same components as in FIG. 1 are labeled with the same reference symbols and will not be described. In the first embodiment, the auxiliary winding 302 and the rectifier diode 304 are added, so that the voltage is induced in the auxiliary windings 301 and 302 for the respective directions of the bidirectional current flowing through the primary winding 109 of the transformer 108, and supplied to the Vcc terminal of the power supply control IC 110. In the second embodiment, a bridge diode 305 as a full-wave rectification circuit is provided at the output of the auxiliary winding 301. This allows the voltage induced in the auxiliary winding 301 to be supplied to the power supply control IC 110 for both directions of the bidirectional current flowing through the primary winding 109 of the transformer 108. It is to be noted that, when current flows through the primary winding 109 in the positive direction (a dashed line) and in the opposite direction (a dotted line), current flows through the auxiliary winding 301 and the bridge diode 305 as indicated by a dashed line and a dotted line, respectively.

Therefore, as described with respect to FIGS. 3A to 3C, the amount of supply of the Vcc terminal voltage by the auxiliary winding 301 increases compared with the conventional case, so that the number of turns of the auxiliary winding 301 can be reduced. Accordingly, the voltage variation in the auxiliary winding 301 due to the variation in the load 204 can be reduced. This allows reducing the withstanding voltage of peripheral components (for example, the smoothing capacitor 307) when the output voltage from the auxiliary winding 301 increases under heavy load, leading to a reduced cost and a reduced substrate area. Further, because the regulation-start timing of the regulation circuit 308 can be delayed, power consumption by the regulation circuit 308 can be reduced.

Thus, according to the second embodiment, the degree of change of the output voltage from the auxiliary winding due to the load can be reduced.

[Description of Power Supply Apparatus and Auxiliary-Winding Power Supply Circuit]

Figure 5:
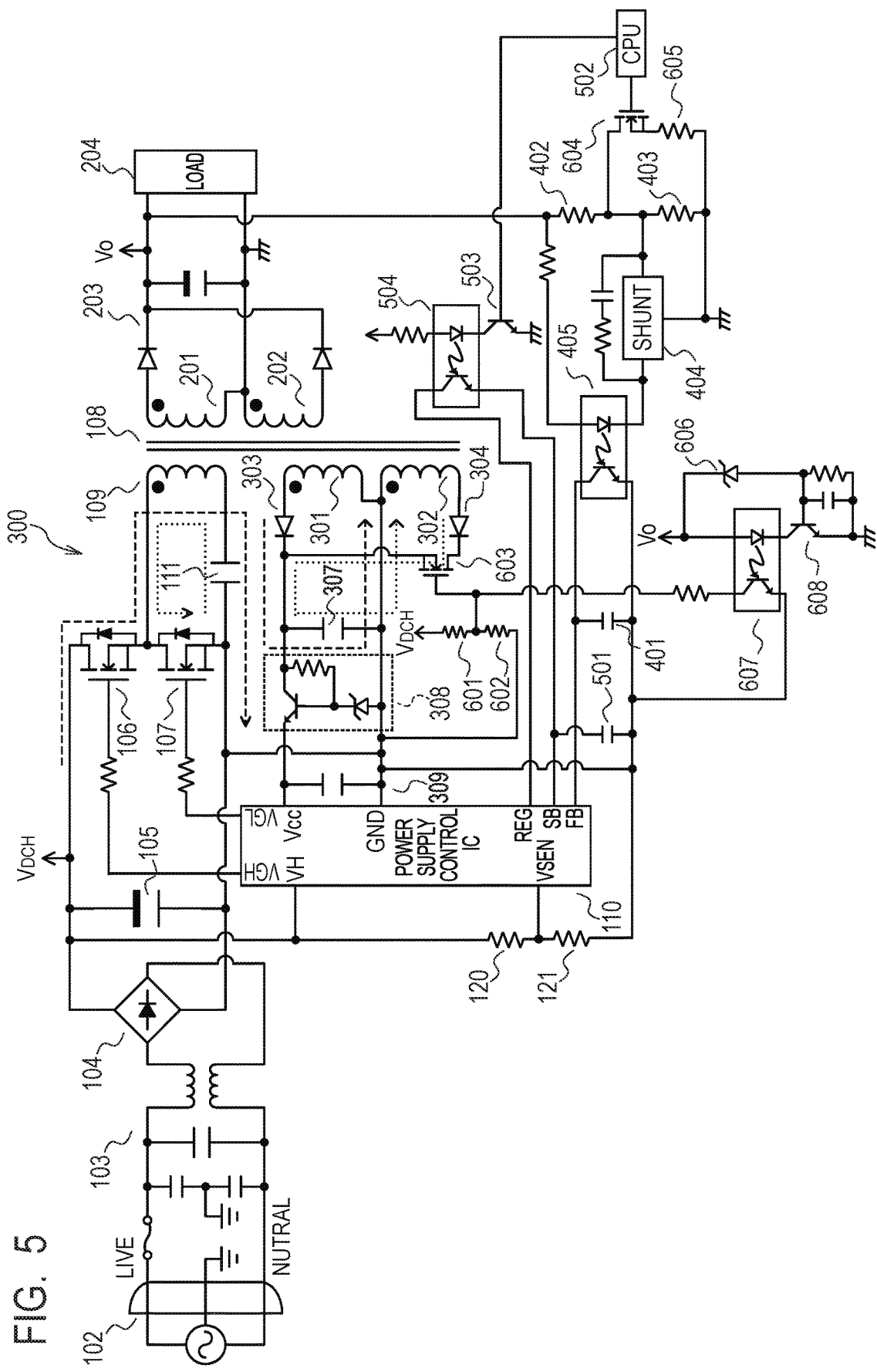
FIG. 5 is a circuit diagram of a power supply apparatus in a third embodiment.

A current-resonant converter 300, which is a power supply apparatus in a third embodiment, will be described with reference to FIG. 5. In the first embodiment, the Vcc terminal voltage is always supplied from the auxiliary windings 301 and 302. In the third embodiment, a circuit is provided in which the voltage supply from one of the auxiliary windings 301 and 302 is cut off if either one of the auxiliary windings 301 and 302 can supply a sufficient Vcc terminal voltage. FIG. 5 illustrates an FET 604 that switches the voltage value of the DC voltage Vo, and a circuit configuration that cuts off the voltage supply from the auxiliary winding 302 depending on the continuity of the FET 604. The drain terminal of the FET 604 is connected to the junction of the resistor 402 and the resistor 403. The source terminal of the FET 604 is connected to one end of a resistor 605. The other end of the resistor 605 is grounded. The gate terminal of the FET 604 receives a signal input from the CPU 502.

One end (the start-of-winding) of the auxiliary winding 302 is connected to the GND terminal of the power supply control IC 110. The other end (the end-of-winding) of the auxiliary winding 302 is connected to the anode terminal of the rectifier diode 304. The cathode terminal of the rectifier diode 304 is connected to the drain terminal of an FET 603. The source terminal of the FET 603 is connected to the cathode terminal of the rectifier diode 303, which has its anode terminal connected to one end (the start-of-winding) of the auxiliary winding 301. One end of a resistor 601 is connected to the voltage VDCH, and the other end of the resistor 601 is connected to one end of a resistor 602. The other end of the resistor 602 is connected to the GND terminal of the power supply control IC 110. The junction of the resistor 601 and the resistor 602 is connected to the gate terminal of the FET 603. The FET 604 functions as a switching unit for switching the voltage value of the DC voltage Vo.

The anode terminal of a photodiode of a photocoupler 607 is connected to the DC voltage Vo, and the cathode terminal of the photodiode is connected to the collector terminal of a transistor 608. The emitter terminal of the transistor 608 is grounded. The anode terminal of a Zener diode 606 is connected to the base terminal of the transistor 608. The cathode terminal of the Zener diode 606 is connected to the anode terminal of the photodiode of the photocoupler 607. The collector terminal of a phototransistor of the photocoupler 607 is connected to the gate terminal of the FET 603. The emitter terminal of the phototransistor of the photocoupler 607 is connected to the GND terminal of the power supply control IC 110. The FET 603 functions as a cut-off unit that cuts off, according to the DC voltage Vo, supply of a voltage induced in the auxiliary winding 302 to the power supply control IC 110.

When the DC voltage Vo is a first voltage that is low (for example, 5 V) (the FET 604 is off), the Zener diode 606 does not operate. Accordingly, the transistor 608 and the photocoupler 607 are off. Therefore, the voltage VDCH smoothed by the primary smoothing capacitor 105 and divided by the resistors 601 and 602 is input to the gate terminal of the FET 603. The FET 603 is turned on, so that the Vcc terminal voltage is supplied from the auxiliary winding 302.

Here, a high-level signal is output from the CPU 502 to the gate terminal of the FET 604, which is then turned on. Once the FET 604 is turned on, the resistor 605 is connected in parallel to the resistor 403, and the DC voltage Vo is controlled to be a second voltage (for example, 24 V) higher than the first voltage. The DC voltage Vo controlled to be high causes the Zener diode 606 to operate, so that the transistor 608 and the photocoupler 607 are turned on and the FET 603 is turned off. Consequently, the voltage supply from the auxiliary winding 302 to the Vcc terminal is cut off. Since the DC voltage Vo increases, the voltage supplied from the auxiliary windings 301 and 302 also increases. Therefore, the voltage supplied from the auxiliary winding 301 can serve a sufficient supply voltage to the Vcc terminal. If the configuration in FIG. 5 is applied, only the voltage supplied from the auxiliary winding 301 is used to provide the Vcc terminal voltage when the DC voltage Vo is high. For this purpose, it is necessary to take into account the amount of change of the DC voltage Vo due to turning on/off the FET 604, and the number of turns of the auxiliary windings 301 and 302.

In FIG. 5, the voltage VDCH smoothed by the primary smoothing capacitor 105 turns on the FET 603. Alternatively, the voltage that turns on the FET 603 may be a voltage resulting from smoothing the voltage at the midpoint of the FETs 106 and 107, or a voltage output from the REG terminal of the power supply control IC 110.

Thus, in the third embodiment, the circuit is configured such that the voltage supply from the auxiliary winding 302 to the Vcc terminal is cut off if the CPU 502 turns on the FET 604 to increase the DC voltage Vo. By cutting off the voltage supply from the auxiliary winding 302 to the Vcc terminal, the increase rate of the voltage in the smoothing capacitor 307 with respect to the load 204 is further reduced (the gradient of a graph corresponding to the solid line A in FIG. 3C is further reduced). Therefore, compared with the case where the voltage supply from the auxiliary winding 302 to the Vcc terminal is not cut off, the start of operation of the regulation circuit 308 can be further delayed.

With the above configuration, the withstanding voltage of the components of the auxiliary-winding power supply circuit (for example, the smoothing capacitor 307) under heavy load can be reduced, which leads to a reduced cost and a reduced substrate area. In addition, because the regulation-start timing of the regulation circuit 308 can be further delayed, power consumption by the regulation circuit 308 can be reduced.

Thus, according to the third embodiment, the degree of change of the output voltage from the auxiliary windings due to the load can be reduced.

[Description of Power Supply Apparatus and Auxiliary-Winding Power Supply Circuit]

Figure 6:
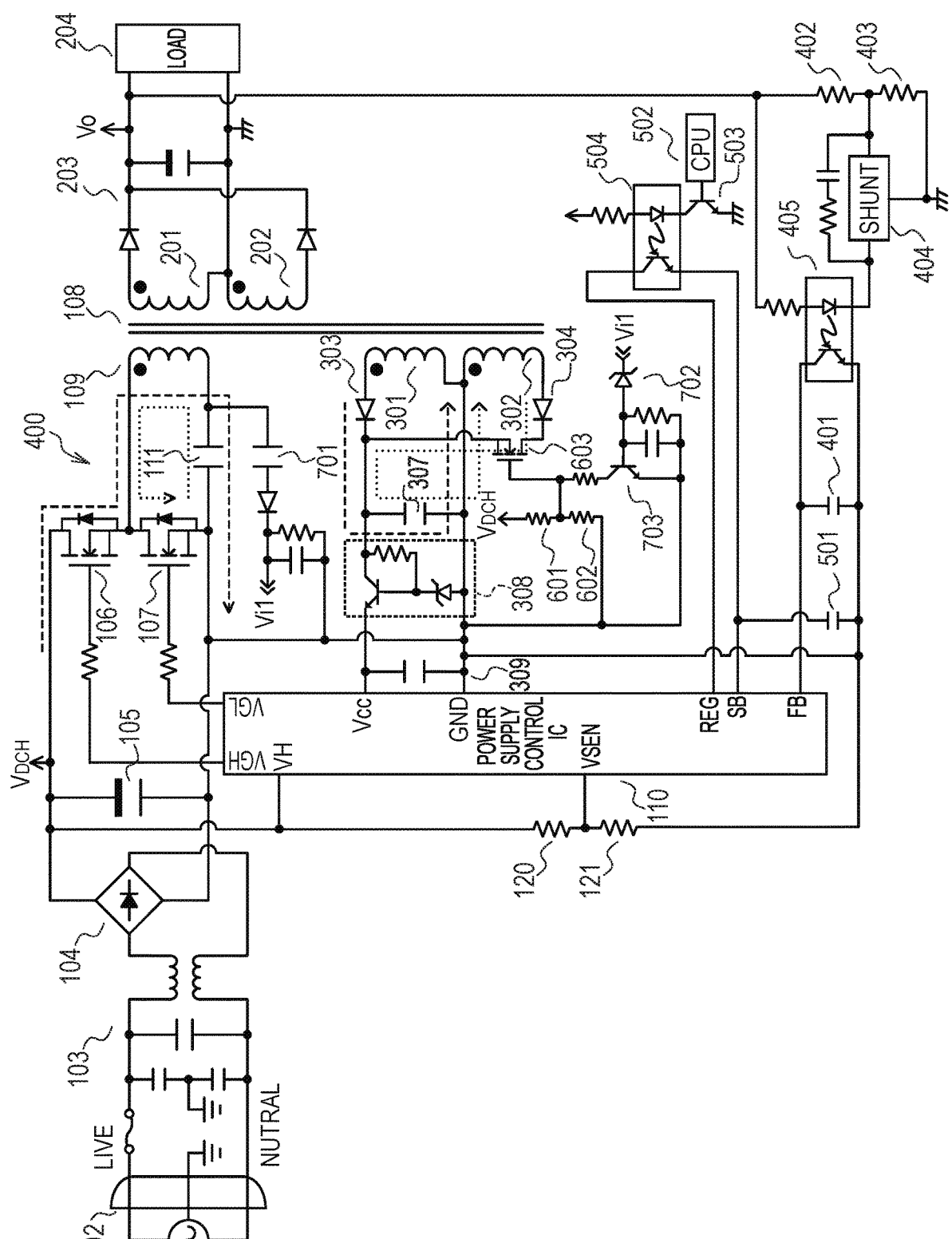
FIG. 6 is a circuit diagram of a power supply apparatus in a fourth embodiment.

A current-resonant converter 400, which is a power supply apparatus in a forth embodiment, will be described with reference to FIG. 6. In the third embodiment, the circuit is configured such that the voltage supply from the auxiliary winding 302 to the Vcc terminal is cut off if the CPU 502 turns on the FET 604 to increase the DC voltage Vo. In the fourth embodiment, the voltage supply from the auxiliary winding 302 is cut off if an increase in the current flowing to the load 204 (an increase in the power to be consumed by the load 204) allows a sufficient Vcc terminal voltage to be supplied from either one of the auxiliary windings 301 and 302. FIG. 6 illustrates a capacitor 701 that shunts the current flowing to the current-resonant capacitor 111, and a circuit configuration in which the voltage supply from the auxiliary winding 302 is cut off according to the current shunted by the capacitor 701.

One end (the end-of-winding) of the primary winding 109 of the transformer 108 is connected to one end of the capacitor 701. The other end of the capacitor 701 is connected to the cathode terminal of a Zener diode 702. The anode terminal of the Zener diode 702 is connected to the base terminal of a transistor 703. The collector terminal of the transistor 703 is connected to the gate terminal of the FET 603, and the emitter terminal of the transistor 703 is connected to the GND terminal of the power supply control IC 110. Other components are as in FIG. 5 and will not be described.

When the current flowing to the current-resonant capacitor 111 is small, a voltage Vi1 shunted and smoothed by the capacitor 701 is lower than the operation voltage (Zener voltage) of the Zener diode 702, so that the transistor 703 is off. Accordingly, the voltage (VDCH) smoothed by the primary smoothing capacitor 105 is shunted by the resistors 601 and 602 and input to the gate terminal of the FET 603. The FET 603 is then turned on, and the Vcc terminal voltage is supplied from the auxiliary winding 302.

By contrast, when the current flowing to the current-resonant capacitor 111 increases and the voltage Vi1 shunted and smoothed by the capacitor 701 reaches or exceeds the operation voltage of the Zener diode 702, the Zener diode 702 operates to turn on the transistor 703. Once the transistor 703 is turned on, the FET 603 is turned off, so that the voltage supply from the auxiliary winding 302 to the Vcc terminal is cut off. Because the increase in the current flowing to the current-resonant capacitor 111 causes the voltage supplied from the auxiliary windings 301 and 302 to increase, the voltage supplied from the auxiliary winding 301 can serve a sufficient Vcc terminal voltage. The capacitor 701 and the Zener diode 702 function as a detection unit that detects the current flowing to the current-resonant capacitor 111. If the current flowing to the current-resonant capacitor 111 reaches or exceeds a predetermined current value, supply of the voltage induced in the auxiliary winding 302 to the power supply control IC 110 is cut off. The predetermined current value is set by the Zener voltage of the Zener diode 702. If the configuration in FIG. 6 is applied, only the voltage supply from the auxiliary winding 301 is used to provide the Vcc terminal voltage when the current flowing to the current-resonant capacitor 111 becomes large. For this purpose, it is necessary to take into account the capacitance of the capacitor 701, the clamping voltage of the Zener diode 702, and the number of turns of the auxiliary windings 301 and 302.

Thus, in the fourth embodiment, the circuit is configured such that the voltage supply from the auxiliary winding 302 to the Vcc terminal is cut off if the current flowing to the current-resonant capacitor 111 becomes large. In FIG. 6, as in the third embodiment, the voltage VDCH smoothed by the primary smoothing capacitor 105 turns on the FET 603. Alternatively, the voltage that turns on the FET 603 may be a voltage resulting from smoothing the voltage at the midpoint of the FETs 106 and 107, or a voltage output from the REG terminal of the power supply control IC 110.

[Another Circuit Configuration]

In the configuration described with respect to FIG. 6, the voltage supply from the auxiliary winding 302 to the Vcc terminal is cut off according to the current flowing to the current-resonant capacitor 111. Alternatively, as in FIG. 7, the voltage supply from the auxiliary winding 302 to the Vcc terminal may be cut off according to the current flowing to the load 204.

Figure 7:
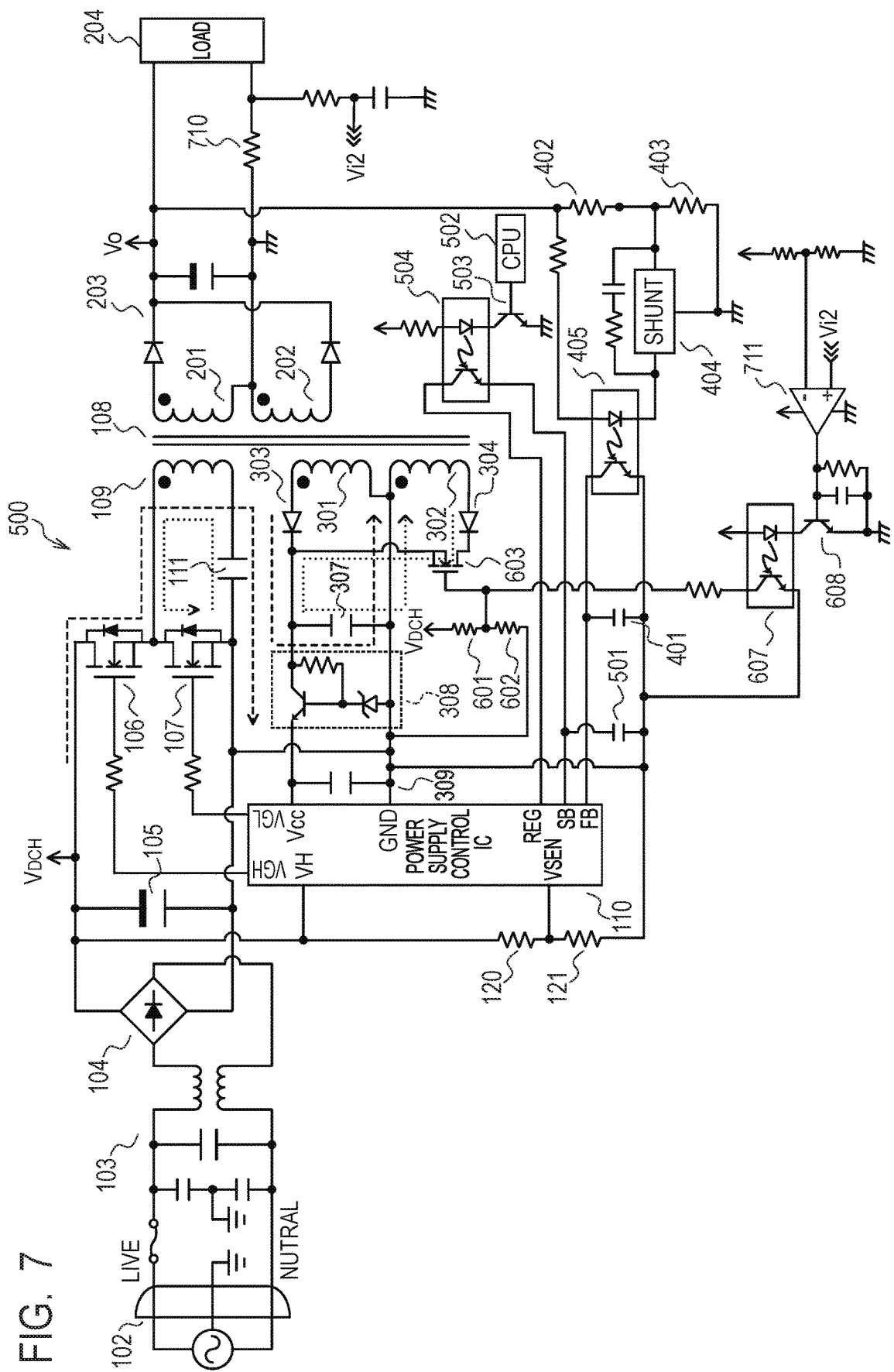
FIG. 7 is a circuit diagram of a power supply apparatus in the fourth embodiment.

In a current-resonant converter 500 shown in FIG. 7, a resistor 710 detects the current flowing to the load 204, and a voltage Vi2 detected by the resistor 710 is input to the non-inverting input terminal (the + terminal) of a comparator 711. The resistor 710 functions as a detection unit that detects the current flowing to the load 204. If the current flowing to the resistor 710 reaches or exceeds a predetermined current value, supply of the voltage induced in the auxiliary winding 302 to the power supply control IC 110 is cut off. The inverting input terminal (the − terminal) of the comparator 711 receives input of a predetermined voltage (hereinafter referred to as a reference voltage). The reference voltage sets the predetermined current value. The comparator 711 compares the voltage Vi2 with the reference voltage and outputs a voltage corresponding to the result of the comparison from the output terminal. The output terminal of the comparator 711 is connected to the base terminal of the transistor 608. If the voltage Vi2 is higher than the reference voltage, the comparator 711 outputs a high-level signal to turn on the transistor 608 and the photocoupler 607. Turning on the transistor 608 and the photocoupler 607 causes the FET 603 to be turned off, so that the voltage supply from the auxiliary winding 302 to the Vcc terminal is cut off.

If the voltage Vi2, which corresponds to the current flowing to the load 204 and detected by the resistor 710, is not higher than the reference voltage, the comparator 711 outputs a low-level signal to turn off the transistor 608. Accordingly, the voltage VDCH divided by the resistors 601 and 602 is input to the gate terminal of the FET 603, which is then turned on. Turning on the FET 603 causes the voltage in the auxiliary winding 302 to be supplied to the Vcc terminal of the power supply control IC 110. Thus, in the current-resonant converter 500 in FIG. 7, the circuit is configured such that the voltage supply from the auxiliary winding 302 to the Vcc terminal is cut off if the current flowing to the load 204 is larger than the predetermined current.

With the above configurations, the withstanding voltage of the components of the auxiliary-winding power supply circuit (for example, the smoothing capacitor 307) under heavy load can be reduced, which leads to a reduced cost and a reduced substrate area. In the circuits in FIGS. 6 and 7, as in the third embodiment, the increase rate of the voltage in the smoothing capacitor 307 with respect to the load 204 is further reduced by cutting off the voltage supply from the auxiliary winding 302 to the Vcc terminal. That is, the gradient of a graph corresponding to the solid line A in FIG. 3C is further reduced. Therefore, compared with the case where the voltage supply from the auxiliary winding 302 to the Vcc terminal is not cut off, the regulation-start timing of the regulation circuit 308 can be further delayed. This allows reduced power consumption by the regulation circuit 308.

Thus, according to the fourth embodiment, the degree of change of the output voltage from the auxiliary windings due to the load can be reduced.

The current-resonant converters, which are power supply apparatuses, described in the first to fourth embodiments are applicable as, for example, a low-voltage power supply for an image forming apparatus, i.e., as a power supply that supplies power to a controller (a control unit) and driving units such as motors. The configuration of an image forming apparatus to which the current-resonant converters in the first to fourth embodiments are applicable will be described below.

[Configuration of Image Forming Apparatus]

Figure 8:
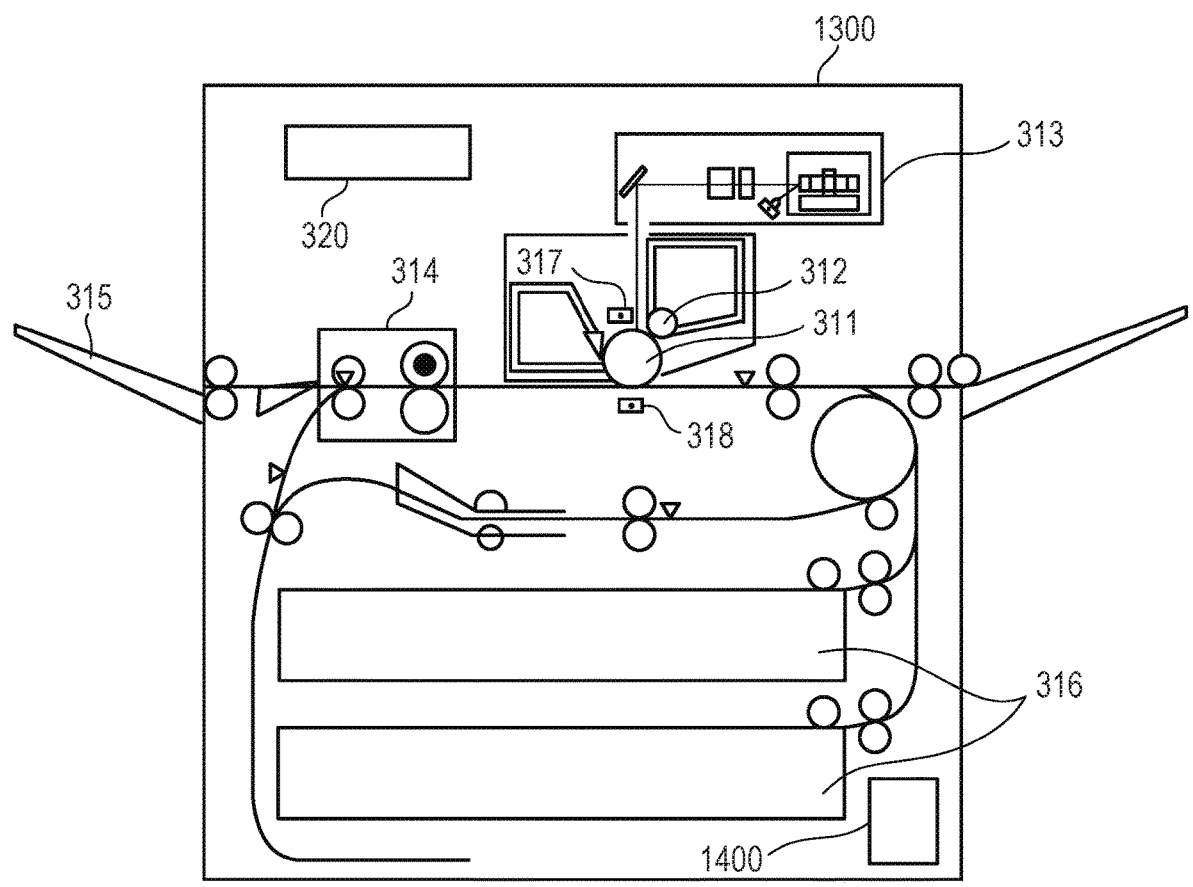
FIG. 8 is a diagram illustrating the configuration of an image forming apparatus.

As an exemplary image forming apparatus, a laser beam printer will be described. FIG. 8 illustrates a general configuration of a laser beam printer, which is an exemplary electrophotographic printer. The laser beam printer 1300 includes: an exposure device 313 (an exposure unit); a photoconductive drum 311 as a photosensitive member on which an electrostatic latent image is formed; and a charge unit 317 (a charge unit) that uniformly charges the photoconductive drum 311. The laser beam printer 1300 includes a development unit 312 (a development unit) that uses toner to develop the electrostatic latent image formed on the photoconductive drum 311. The toner image developed on the photoconductive drum 311 is then transferred by a transfer unit 318 (a transfer unit) onto a sheet (not shown), which is a recording medium, fed from a cassette 316. The transferred toner image on the sheet is fixed by a fuser 314, and the sheet is ejected onto a tray 315. The photoconductive drum 311, the charge unit 317, the development unit 312 and the transfer unit 318 constitute an image forming unit. The laser beam printer 1300 includes a power supply apparatus 1400. The power supply apparatus 1400 may be any of the current-resonant converters 100 to 500 described in the first to fourth embodiments. The image forming apparatus to which the power supply apparatus 1400 is applicable is not limited to the apparatus illustrated in FIG. 8, but may include multiple image forming units, for example. Further, the image forming apparatus may include a primary transfer unit for transferring a toner image on the photoconductive drum 311 onto an intermediate transfer belt, and a secondary transfer unit for transferring the toner image on the intermediate transfer belt onto a sheet.

The laser beam printer 1300 includes a controller 320 that controls image forming operation performed by the image forming unit and sheet conveyance operation, and the power supply apparatus 1400 supplies power to, for example, the controller 320. The power supply apparatus 1400 also supplies power to driving units, such as a motor for rotating the photoconductive drum 311 and a motor for driving rollers that convey sheets. That is, the load 204 in the first to fourth embodiments corresponds to the controller 320 and the driving units. The laser beam printer 1300 in this fifth embodiment can operate in a power-saving state (for example, power-saving mode or standby mode) in which a smaller power is consumed than in image forming operation. When the laser beam printer 1300 is operating in the power-saving state, the power supply apparatus 1400 operates in the intermittent mode. When the laser beam printer 1300 is operating in a normal image-forming operation state, the power supply apparatus 1400 operates in the continuous mode. The CPU 502 may be a CPU of the controller 320.

Thus, in the image forming apparatus in the fifth embodiment, the degree of change of the output voltage from the auxiliary windings due to the load can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-118584, filed Jun. 22, 2018, which is hereby incorporated by reference herein in its entirety.

What is claimed is:

1. A power supply apparatus comprising:
   a transformer having a primary winding, a secondary winding and an auxiliary winding;
   a first switching element connected in series to the primary winding;
   a capacitor connected in series to the primary winding;
   a second switching element connected in parallel to the primary winding and the capacitor connected in series to the primary winding;
   a control unit configured to operate with an operation-enable voltage which is a voltage induced in the auxiliary winding to control switching operation of the first switching element and the second switching element; and
   an adjustment unit configured to adjust a resultant voltage in which a voltage induced in the auxiliary winding while current is flowing in a predetermined direction with respect to the auxiliary winding in a case where the first switching element turned on and the second switching element turned off is applied into a voltage induced in the auxiliary winding while current is flowing in an opposite direction opposite to the predetermined direction with respect to the auxiliary winding in a case where the first switching element turned off and the second switching element turned on, and supply the resultant voltage to the control unit.

2. A power supply apparatus according to claim 1, wherein the auxiliary winding comprises:
   at least one first auxiliary winding in which a voltage is induced while current is flowing in the predetermined direction with respect to the auxiliary winding; and
   at least one second auxiliary winding in which a voltage is induced while current is flowing in the opposite direction with respect to the auxiliary winding.

3. A power supply apparatus according to claim 2, comprising a cut-off unit configured to cut off, according to an output voltage, supply of the voltage induced in the second auxiliary winding as the operation-enable voltage to the control unit.

4. A power supply apparatus according to claim 3, comprising a switching unit configured to switch a voltage value of the output voltage,
   wherein in a case where the output voltage is switched by the switching unit from a first voltage to a second voltage higher than the first voltage, the cut-off unit cuts off supply of the voltage induced in the second auxiliary winding as the operation-enable voltage to the control unit.

5. A power supply apparatus according to claim 2, comprising a cut-off unit configured to cut off supply of the voltage induced in the second auxiliary winding as the operation-enable voltage to the control unit, according to a current flowing to a load to which an output voltage is supplied.

6. A power supply apparatus according to claim 5, comprising a detection unit configured to detect a current flowing to the capacitor,
   wherein in a case where the current detected by the detection unit is not smaller than a predetermined current value, the cut-off unit cuts off supply of the voltage induced in the second auxiliary winding as the operation-enable voltage to the control unit.

7. A power supply apparatus according to claim 5, comprising a detection unit configured to detect a current flowing to the load,
   wherein in a case where the current detected by the detection unit is not smaller than a predetermined current value, the cut-off unit cuts off supply of the voltage induced in the second auxiliary winding as the operation-enable voltage to the control unit.

8. A power supply apparatus according to claim 2, wherein the first auxiliary winding and the second auxiliary winding have a same number of turns.

9. A power supply apparatus according to claim 2,
   wherein the first auxiliary winding comprises a plurality of first auxiliary windings, and the second auxiliary winding comprises a plurality of second auxiliary windings, and
   wherein the first auxiliary windings and the second auxiliary windings are same in number.

10. A power supply apparatus according to claim 1, comprising a full-wave rectification circuit connected to the auxiliary winding.

11. A power supply apparatus according to claim 1, wherein in a case where the voltage induced in the auxiliary winding is not lower than a predetermined voltage, the adjustment unit supplies the predetermined voltage as the operation-enable voltage to the control unit, and in a case where the voltage induced in the auxiliary winding is lower than the predetermined voltage, the adjustment unit supplies the voltage induced in the auxiliary winding as the operation-enable voltage to the control unit.

12. A power supply apparatus according to claim 11, wherein the adjustment unit has a Zener diode, and the predetermined voltage is determined by a Zener voltage of the Zener diode.

13. A power supply apparatus according to claim 1, wherein the control unit is operable in a first state in which the switching operation is continuously performed, and in a second state in which a period of performing the switching operation and a period of halting the switching operation are alternately repeated.

14. An image forming apparatus comprising:
an image forming unit for forming an image; and
a power supply apparatus for supplying power to the image forming apparatus,
wherein a transformer having a primary winding, a secondary winding and an auxiliary winding;
a first switching element connected in series to the primary winding;
a capacitor connected in series to the primary winding;
a second switching element connected in parallel to the primary winding and the capacitor connected in series to the primary winding;
a control unit configured to operate with an operation-enable voltage which is a voltage induced in the auxiliary winding to control switching operation of the first switching element and the second switching element; and
an adjustment unit configured to adjust a resultant voltage in which a voltage induced in the auxiliary winding while current is flowing in a predetermined direction with respect to the auxiliary winding in a case where the first switching element turned on and the second switching element turned off is applied into a voltage induced in the auxiliary winding while current is flowing in an opposite direction opposite to the predetermined direction with respect to the auxiliary winding in a case where the first switching element turned off and the second switching element turned on, and supply the resultant voltage to the control unit.

15. An image forming apparatus according to claim 14, wherein the image forming unit comprises:
a photosensitive member;
an exposure unit configured to form a latent image on the photosensitive member;
a development unit configured to develop the latent image formed by the exposure unit and form a toner image; and
a transfer unit configured to transfer the toner image onto a recording medium.

16. An image forming apparatus according to claim 15, wherein the control unit is operable in a first state in which the switching operation is continuously performed, and in a second state in which a period of performing the switching operation and a period of halting the switching operation are alternately repeated, and
wherein the control unit operates in the first state while image forming operation is performed, and operates in the second state while the image forming operation is stopped.

* * * * *